United States Patent
Yanai

(10) Patent No.: US 10,507,512 B2
(45) Date of Patent: Dec. 17, 2019

(54) FRAME MOLDING

(71) Applicants: SHIROKI CORPORATION, Fujisawa-shi, Kanagawa (JP); AISIN SEIKI KABUSHIKI KAISHA, Kariya-shi, Aichi-ken (JP)

(72) Inventor: Toshifumi Yanai, Toyokawa (JP)

(73) Assignees: SHIROKI CORPORATION, Fujisawa-Shi, Kanagawa (JP); AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 105 days.

(21) Appl. No.: 15/916,504

(22) Filed: Mar. 9, 2018

(65) Prior Publication Data

US 2018/0272413 A1 Sep. 27, 2018

(30) Foreign Application Priority Data

Mar. 22, 2017 (JP) ................................. 2017-056536

(51) Int. Cl.
| | |
|---|---|
| *B21D 53/74* | (2006.01) |
| *B60J 5/04* | (2006.01) |
| *B29C 45/14* | (2006.01) |
| *B60R 13/04* | (2006.01) |
| *F16B 1/00* | (2006.01) |

(52) U.S. Cl.
CPC .............. *B21D 53/74* (2013.01); *B29C 45/14* (2013.01); *B60J 5/0411* (2013.01); *B60R 13/043* (2013.01); *F16B 1/00* (2013.01); *B29C 2045/1486* (2013.01)

(58) Field of Classification Search
CPC . B21D 53/74; B29C 45/14; B29C 2045/1486; B60J 5/0411; F16B 1/00
See application file for complete search history.

(56) References Cited

U.S. PATENT DOCUMENTS

| | | | |
|---|---|---|---|
| 9,242,537 B2 * | 1/2016 | Yoshida | ................... B60R 13/04 |
| 2011/0163563 A1 * | 7/2011 | Yanai | .......................... B60J 1/00 |
| | | | 296/1.08 |
| 2014/0292012 A1 * | 10/2014 | Yoshida | ................. B60R 13/04 |
| | | | 296/1.08 |
| 2016/0200266 A1 * | 7/2016 | Makita | ................... B60J 5/0411 |
| | | | 49/462 |
| 2016/0221421 A1 * | 8/2016 | Makita | .................... B60R 13/04 |

FOREIGN PATENT DOCUMENTS

| | | |
|---|---|---|
| JP | 2015-48002 A | 3/2015 |
| JP | 2010-76650 A | 4/2015 |

* cited by examiner

*Primary Examiner* — Lori L Lyjak
(74) *Attorney, Agent, or Firm* — Buchanan Ingersoll & Rooney PC

(57) ABSTRACT

According to one embodiment, a clip is assembled to an inner member in a state where the clip penetrates through a through-hole of the inner member. The through-hole penetrates between a bottom surface of a recessed part and an inner surface in the inner member, in other words, between front and rear surfaces of the inner member. This configuration enables a part where the inner member holds the clip to be formed relatively thicker. Thus, strength of a connection part of the clip and the inner member can be further enhanced.

7 Claims, 7 Drawing Sheets

FRAME MOLDING

CROSS-REFERENCE TO RELATED APPLICATIONS

This application is based upon and claims the benefit of priority from Japanese Patent Application No. 2017-056536, filed Mar. 22, 2017, the entire contents of which are incorporated herein by reference.

FIELD

An embodiment described herein relates generally to a frame molding.

BACKGROUND

Conventionally, frame moldings for door panel are known. Such a frame molding is attached to the edge of a window aperture of a door panel with clips fixed to a metal design member (for example, Japanese Patent Application Laid-open No. 2015-48002).

It is beneficial to attain a higher-rigidity frame molding with a new structure and less inconvenience in attachment to a door panel.

An object of the present invention is, for example, to provide a higher-rigidity frame molding with less inconvenience in attachment to a door panel.

SUMMARY

In general, according to one embodiment, a frame molding includes a design member, an inner member, and a clip. The design member extends along an edge of a window aperture of a door panel, and includes an exposed surface and an inner surface opposite to the exposed surface. The inner member extends along the edge and is covered with the design member, the inner member including an outer surface, provided with a through-hole, and fixed to the design member, the outer surface that faces the inner surface of the design member, the through-hole being open to the outer surface and extending in a direction away from the design member. The clip inserts through the through-hole of the inner member for fixing, and is covered with the design member, the clip including a fixing part that projects from the inner member oppositely to the design member for fixing to the door panel.

DETAILED DESCRIPTION

An exemplary embodiment of the present invention will now be described. The configuration of the embodiment described below, and actions and results (effects) caused by the configuration are presented by way of example. The present invention can be achieved by configurations other than the configuration disclosed in the following embodiment. The present invention can attain at least one of various kinds of effects (including derivative-effects) attained by the configuration. In the specification, ordinal numerals are assigned not to represent priority or order but to distinguish components and parts for convenience.

In the accompanying drawings, directions are defined for a frame molding 1 when attached to a door panel 10 with a door closed (hereinafter, simply referred to as attached state) for convenience. X, Y, and Z directions indicate a vehicular front side, outward in a vehicle width direction, and a vehicular upside, respectively. Unless otherwise noted, the directions are defined for the frame molding 1 in the attached state throughout the specification. In the following, the frame molding 1 may be referred to as being in assembled state in which components of the frame molding 1 are assembled.

Figure 1:
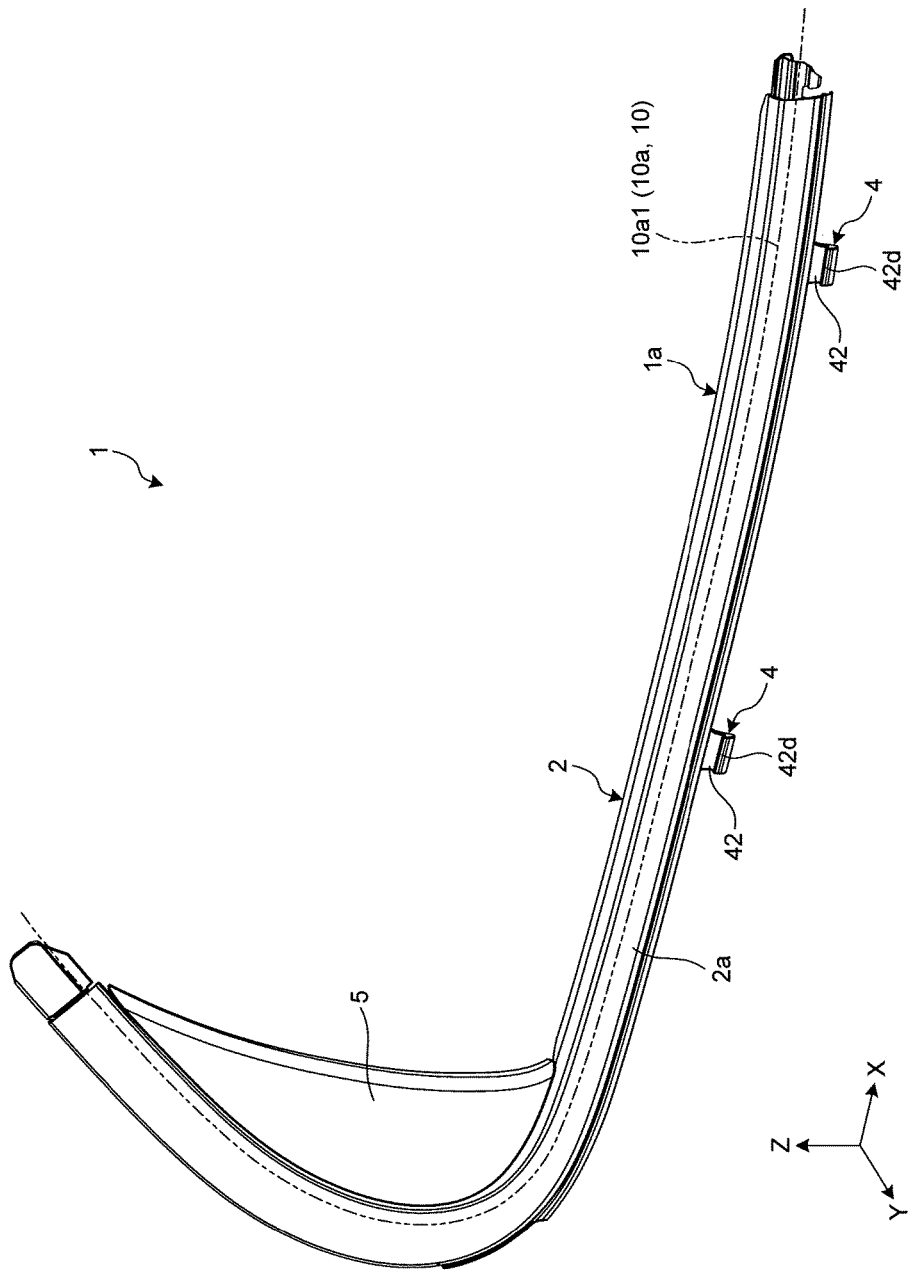
FIG. 1 is s a schematic and exemplary perspective view illustrating the entire frame molding according to an embodiment, as seen from outside a vehicle interior.
Figure 2:
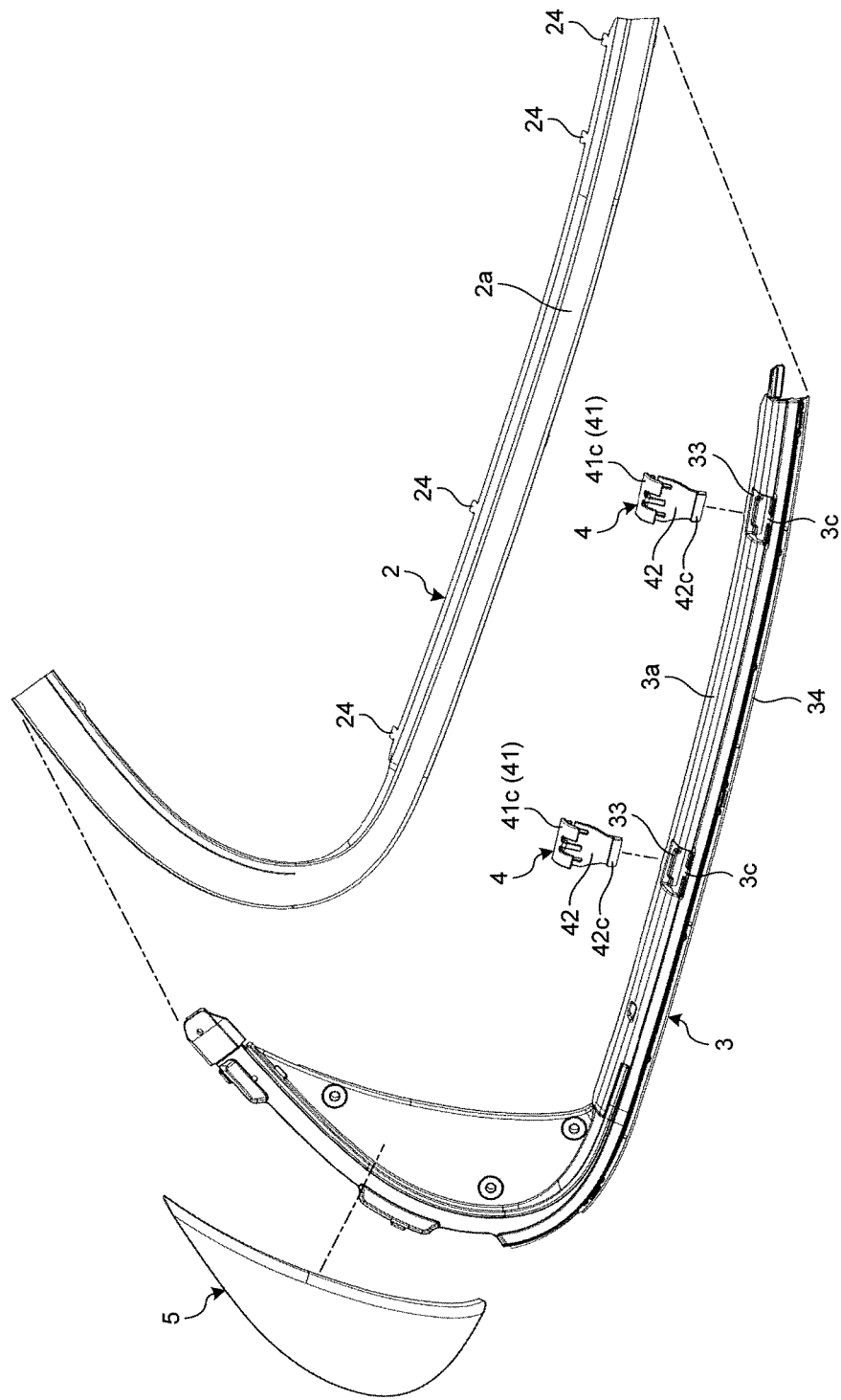
FIG. 2 is a schematic and exemplary exploded perspective view illustrating the frame molding according to the embodiment, as seen from outside the vehicle interior.
Figure 3:
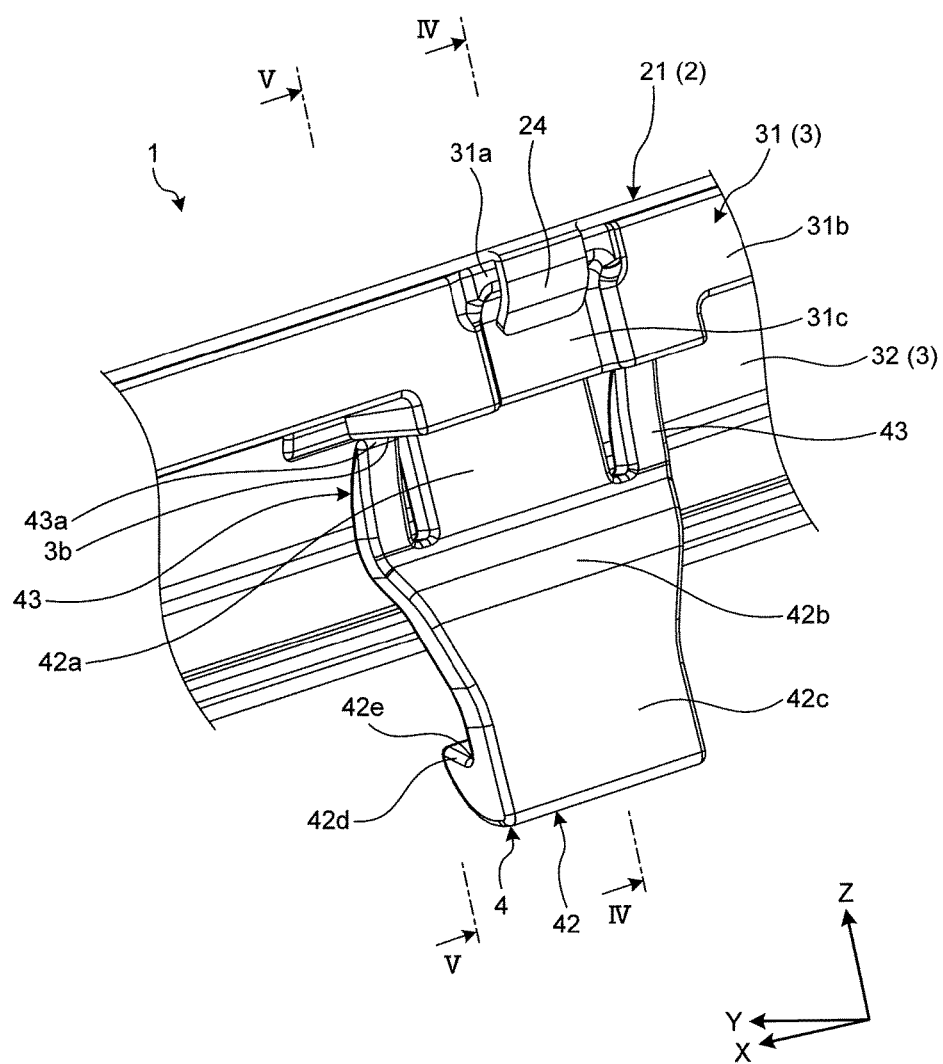
FIG. 3 is a perspective view illustrating a part of the frame molding according to the embodiment, as seen from the vehicle interior.
Figure 4:
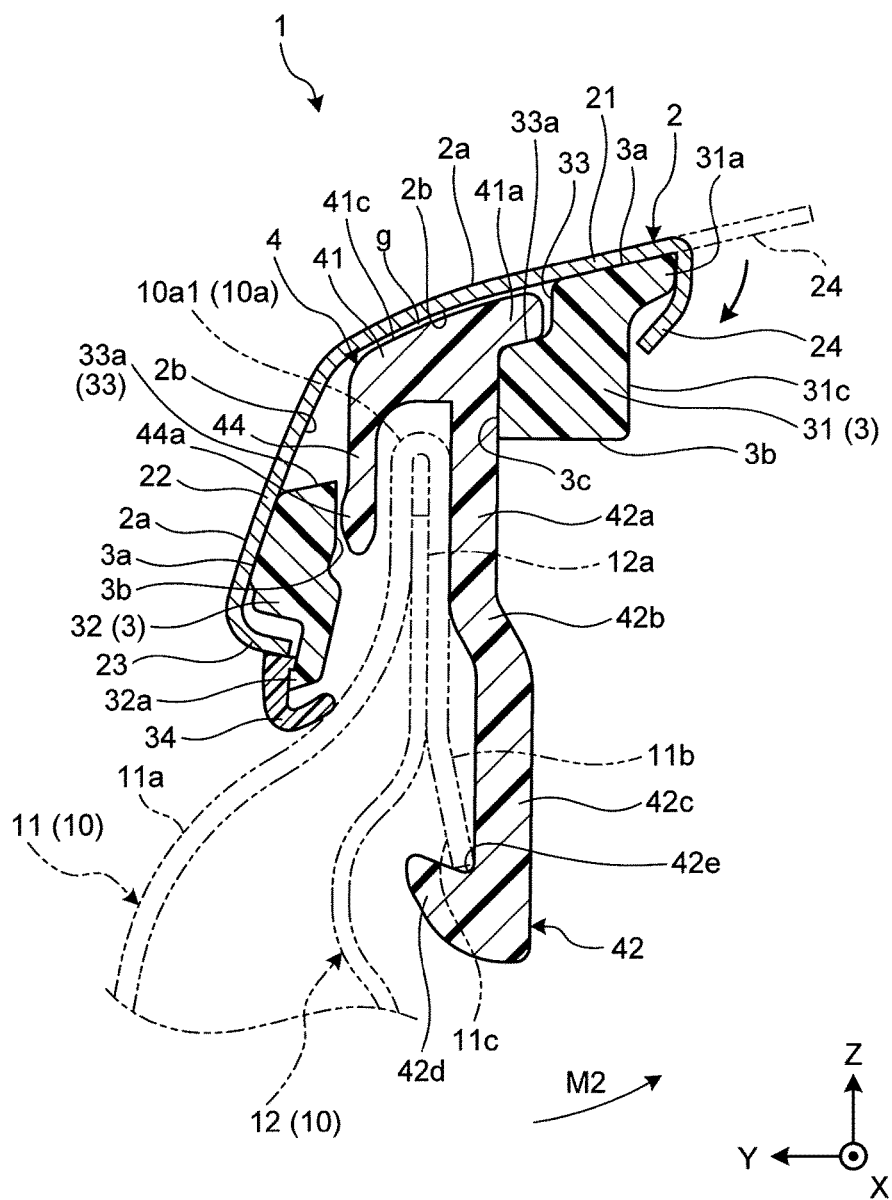
FIG. 4 is a cross-sectional view along the line IV-IV in FIG. 3.
Figure 5:
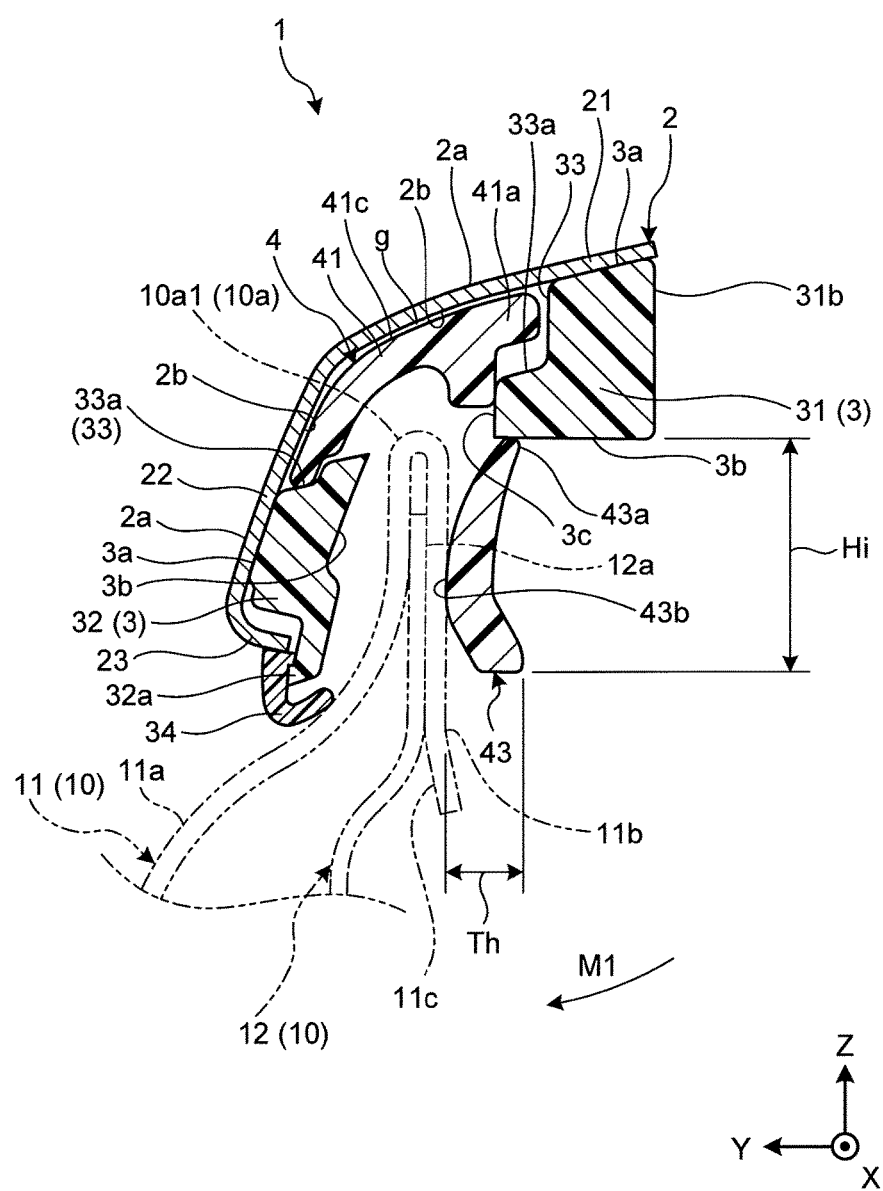
FIG. 5 is a cross-sectional view along the line V-V in FIG. 3.
Figure 6:
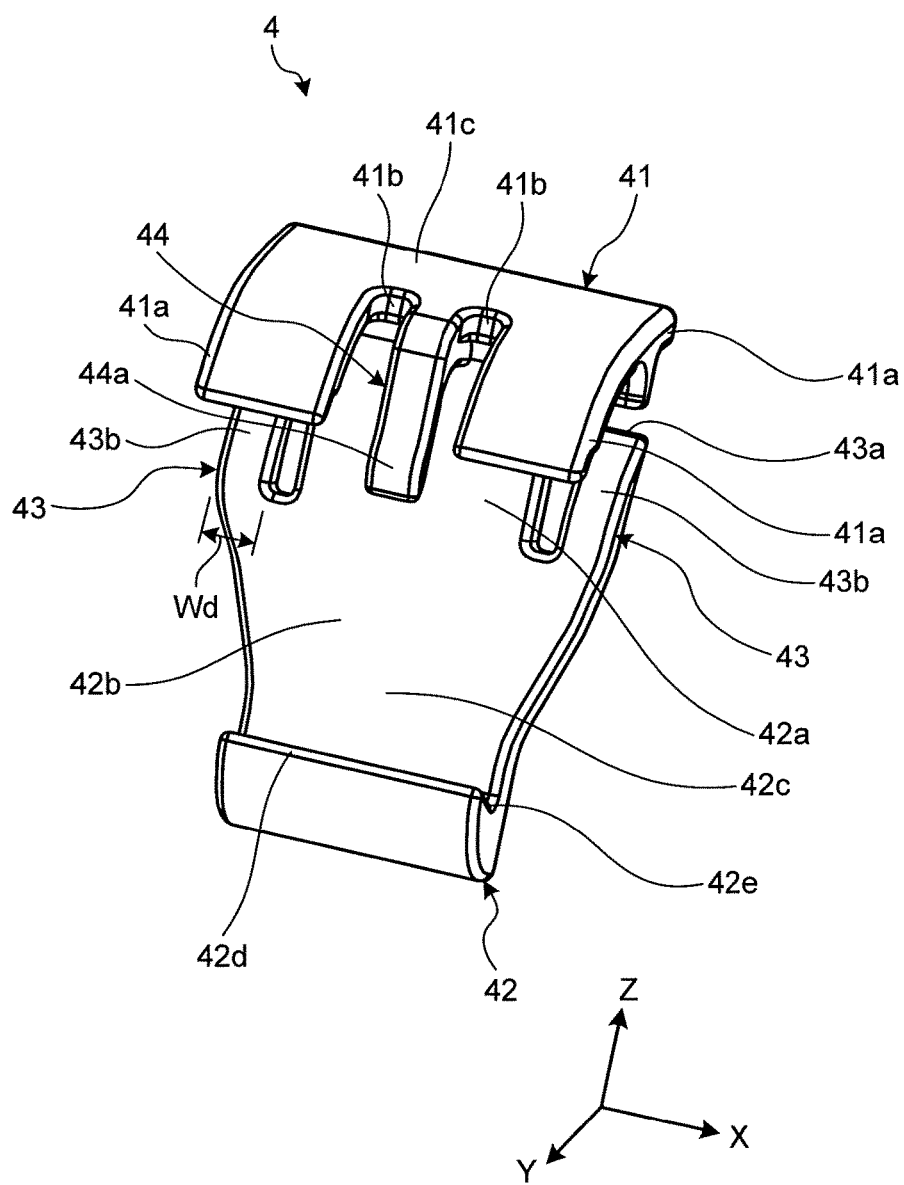
FIG. 6 is a perspective view illustrating a clip of the frame molding according to the embodiment.
Figure 7:
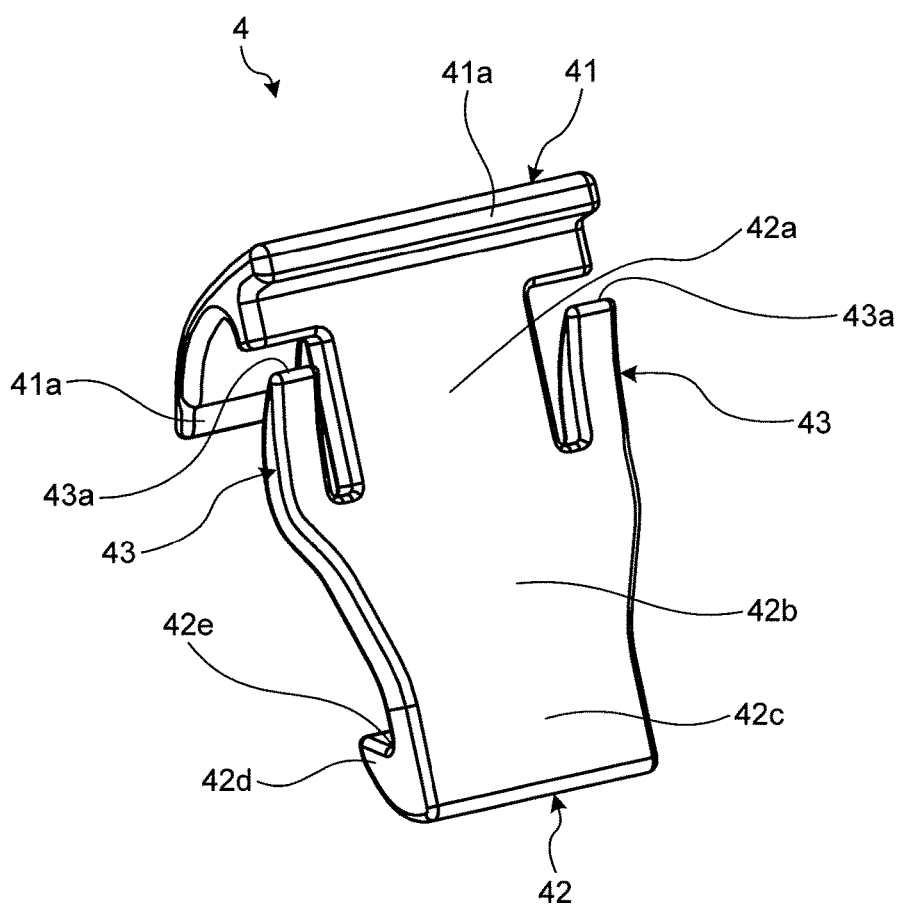
FIG. 7 is a perspective view illustrating the clip of the frame molding according to the embodiment, as seen oppositely from FIG. 6.

FIG. 1 is a perspective view illustrating the entire frame molding 1, FIG. 2 is an exploded perspective view illustrating the frame molding 1, FIG. 3 is a perspective view illustrating a part of the frame molding 1, as seen oppositely from FIG. 1, and FIGS. 4 and 5 are cross-sectional views illustrating the frame molding 1 at different positions. FIGS. 6 and 7 are perspective views illustrating clips 4 of the frame molding 1 at different angles.

As illustrated in FIG. 1, the frame molding 1 curves and extends along an edge 10a of a window aperture of the door panel 10 covering from the bottom to a rear corner. The frame molding 1 includes arms 42 with hooks 42d that project downward. The arms 42 are spaced apart at multiple locations, e.g., at two locations in the embodiment, on a back and forth extension 1a of the frame molding 1 in longitudinal direction. The back and forth extension 1a corresponds to a lower edge 10a1 of the edge 10a. In the embodiment, the lower edge 10a1 extends in a vehicle front-rear direction and the arms 42 extend downward at the positions of the clips 4 of FIG. 3 to FIG. 7, by way of example, however, they are not limited thereto.

As illustrated in FIG. 2, the frame molding 1 includes a design member 2, an inner member 3, the clips 4, and a corner cover 5. The design member 2 extends along the edge 10a and includes a design surface 2a as illustrated in FIG. 1. The inner member 3 extends along the edge 10a as illustrated in FIG. 1, and is covered with the design member 2 as illustrated in FIG. 2. The clips 4 are spaced apart along the edge 10a, and include the arms 42 and the hooks 42d. The arms 42 and the hooks 42d form a snap fit mechanism, and move from a non-attachment position to an attachment position while elastically deform at the time of being attached to the door panel 10.

In the embodiment, the design member 2, the inner member 3 and the clips 4 of the frame molding 1 are formed of mutually different materials. Due to the components made of different materials, the frame molding 1 can fulfill various kinds of functions at a higher level. For example, the design member 2 is formed of a metal material (for example, stainless steel), and the inner member 3 and the clips 4 are formed of a synthetic resin material. The metal material can ensure rigidity of the frame molding 1 and the synthetic resin material leads to reducing the weight of the frame molding 1. The inner member 3 is formed of a relatively hard synthetic resin material and the clips 4 are formed of a synthetic resin material softer than that of the inner member 3. The relatively hard synthetic resin material can ensure rigidity of the frame molding 1 and the softer synthetic resin material can contribute to easier and more secure attachment of the frame molding 1 to the door panel 10.

The design member 2 includes the design surface 2a that is exposed to the outside of a vehicle interior and an inner surface 2b opposite to the design surface 2a as illustrated in FIG. 4. The design member 2 can be made of a plate member by, for example, roll-forming. The design surface 2a is an exemplary exposed surface.

The design member 2 also includes a top wall 21, a side wall 22, and an end wall 23. The top wall 21 is located at the top, and the side wall 22 is located outside in a vehicle width direction. The end wall 23 is bent inward at the bottom end of the side wall 22 in the vehicle width direction. The end wall 23 may be referred to as a bent part or a flange. The top wall 21, the side wall 22, and the end wall 23 are smoothly connected to each other through curved parts. The design member 2 also includes fasteners 24 on the opposite side of the end wall 23 in the cross-section in FIG. 4, in other words, at the inner and upper end in the vehicle width direction. The fasteners 24 are bent downward and outward in the vehicle width direction so as to hold flanges 31a of the inner member 3 and fasten the design member 2 to the inner member 3. As illustrated in FIG. 4, the fasteners 24 are bent as indicated by the solid line from the extended position along the top wall 21 as indicated by the dashed-two dotted line. By fastening with the fasteners 24, the inner member 3 is integrated with the design member 2 without looseness while being held among the top wall 21, the side wall 22, and the fastener 24. In other words, both the inner surface 2b of the top wall 21 and the inner surface 2b of the side wall 22 are closely attached to an outer surface 3a of the inner member 3. The positions of the fasteners 24 will be described later. The shape of the design member 2 can be changed in various ways, and is not limited to the shape illustrated in FIGS. 2, 4, and 5.

The inner member 3 includes the outer surface 3a that faces and contacts the inner surface 2b of the design member 2 and an inner surface 3b opposite to the outer surface 3a. The inner member 3 can be formed of a synthetic resin material by injection molding, for example.

The inner member 3 includes a top wall 31 and a side wall 32. The top wall 31 is covered with the top wall 21 of the design member 2 from the upper side of the vehicle. The side wall 32 is covered with the side wall 22 of the design member 2 laterally (outside in the vehicle width direction). The top wall 31 and the side wall 32 are smoothly connected to each other through a curved part (not illustrated). A bottom edge 32a of the side wall 32 is provided with a lip 34. The lip 34 is formed of an elastomer, for instance. The lip 34 may be integrally formed with the inner member 3 by two-color molding, for example.

As illustrated in FIGS. 2 and 4, the outer surface 3a of the inner member 3 are provided with recesses 33 that are open toward the design member 2, or toward the vehicular top in the embodiment. The inner member 3 is also provided with through-holes 3c that penetrate between bottom surfaces 33a of the recesses 33 and the inner surface 3b of the inner member 3. Each of the through-holes 3c is open to the bottom surface 33a and extends toward the design member 2. Although not illustrated, the cross-sectional shape of the through-holes 3c is rectangular. In the embodiment, the through-holes 3c vertically extend by way of example, however, it is not limited to this example.

As illustrated in FIG. 3, a side surface 31b of the top wall 31 of the inner member 3 faces inward in the vehicle width direction and is provided with a recess 31c which is depressed outward in the vehicle width direction. The flange 31a is located above and adjacent to the recess 31c. As illustrated in FIGS. 3 and 4, the recess 31c functions as a housing that houses an end of the fastener 24 bent to hold the flange 31a. Owing to such structure, an assembling worker can assemble the design member 2 and the inner member 3, using the flange 31a and the recesses 31c as a mark for positioning the extended fasteners 24 before fastening, thereby improving workers' workability.

As illustrated in FIGS. 4 and 5, each of the clips 4 is attached to the door panel 10. The door panel 10 includes an outer panel 11 and an inner panel 12 in the vehicle width direction. The outer panel 11 includes an outer wall 11a and a folded part 11b. The folded part 11b is located above a top end 12a of the inner panel 12 and folded back downward in the vehicle so as to wrap around the end 12a. In other words, the outer panel 11 is joined to the top end 12a of the inner panel 12 by hemming process. A bent part of the outer panel 11 is the edge 10a of the window aperture. The clips 4 are hooked to an end 11c of the folded part 11b, the end of which is further from the inner panel 12.

As illustrated in FIGS. 6 and 7, each of the clips 4 includes a head 41, an arm 42, two first prongs 43, and a second prong 44. The head 41 extends along the edge 10a, and curves along the design member 2 as illustrated in FIGS. 4 and 5. In the embodiment, as illustrated in FIGS. 4 and 5, an outer surface 41c of the head 41 faces the inner surface 2b of the design member 2 with a gap g. If the outer surface 41c of the head 41 and the inner surface 2b of the design member 2 are closely attached to each other, a part, of the design member 2, that covers a gap between the outer surface 3a of the inner member 3 and the outer surface 41c of the head 41 may become dented at the time of fastening the fastener 24. In this regard, in the embodiment, the outer surface 3a of the inner member 3 is closely attached to the inner surface 2b of the design member 2, but the outer surface 41c of the head 41 is not closely attached to the inner surface 2b of the design member 2, which can prevent the part of the design member 2 from being dented.

As illustrated in FIGS. 6 and 7, the head 41 is U-shaped and open downward and outward in the vehicle width direction. The head 41 is provided with cutouts 41b corresponding to the U-shape.

The arm 42 projects from the head 41. In assembled state the arm 42 projects in a direction away from the design member 2. As illustrated in FIGS. 6 and 7, the arm 42 has a belt-like, planar shape. The arm 42 has a width in the vehicle front-rear direction larger than a thickness in the vehicle width direction, and extends, for example, toward the vehicular bottom, as illustrated in FIG. 4. The arm 42 does not necessarily extend in parallel to the vehicular bottom as illustrated in FIG. 4, and may extend obliquely downward.

Each of the arms 42 includes a first extension 42a, a bent part 42b, and a second extension 42c. The first extension 42a is the bottom of the arm 42 and adjacent to the head 41, and extends toward the vehicular bottom in the assembled state. The second extension 42c is on the opposite side of the head 41 with respect to the first extension 42a, and extends toward the vehicular bottom in the assembled state. The first extension 42a and the second extension 42c are parallel to each other. The second extension 42c is slightly offset inward from the first extension 42a in the vehicle width direction. The bent part 42b smoothly connects the first extension 42a and the second extension 42c in crank form.

The second extension 42c (arm 42) includes, at the tip end, the hook 42d that obliquely projects upward and toward outside in the vehicle width direction. The hook 42d is hooked to the end 11c of the outer panel 11. In this state, the end 11c of the outer panel 11 is inserted into a recess 42e between the second extension 42c and the hook 42d. The hook 42d is an example of a fixing part.

The two first prongs 43 project from both longitudinal ends of the middle part of the arm 42 in a direction opposite to the projecting direction of the arm 42, in other words, a direction (to vehicular top) toward the design member 2 in the assembled state. As illustrated in FIG. 5, a length Hi of the first prongs 43 from the arm 42 is larger than a thickness Th of the first prongs 43 and a width Wd illustrated in FIG. 6. As illustrated in FIG. 5, tips 43a of the first prongs 43 are located more inward in the vehicle width direction than bottom ends connected to the arm 42, and the first prongs 43 extend obliquely upward away from the arm 42. Having such shape, each of the first prongs 43 is supported by the arm 42, thus can function as a cantilever (plate spring) that is elastically deformable relatively easily in the vehicle width direction. Outer surfaces 43b of the first prongs 43 in the vehicle width direction also function as contact surfaces (support surface) with the door panel 10.

As illustrated in FIG. 6, the second prong 44 extends downward from the bottom center of the cutouts 41b of the head 41. The second prong 44 is provided at the tip with an expanded part 44a that expands outward in the vehicle width direction.

As illustrated in FIGS. 4 to 7, the head 41 includes two flanges 41a. One of the two flanges 41a projects inward in the vehicle width direction from a center of the head 41 (bottom of the arm 42) along the top wall 21 of the design member 2. The other flange 41a projects outward in the vehicle width direction and toward the vehicular bottom from the center of the head 41 along the side wall 22 of the design member 2. The other flange 41a, which projects outward in the vehicle width direction and toward the vehicular bottom, is branched into two.

In non-assembled state of the design member 2, the clips 4 are attached to the inner member 3. Specifically, the arm 42 of each clip 4 is inserted into the through-hole 3c open to the recess 33 of the inner member 3 from above in FIGS. 2 and 4 until the flanges 41a hit the bottom surface 33a of the recess 33. The first prongs 43 are then relatively pressed onto the inner surface of the through-hole 3c to move downward while elastically deforming outward in the vehicle width direction. As described above, the first prongs 43 serve as a cantilever, therefore, is elastically deformable relatively easily. When inserting through the through-hole 3c, the first prongs 43 are released from the pressing force from the inner surface of the through-hole 3c and return to the initial position. Thus, the first prongs 43 form a snap fit mechanism. With the flanges 41a hitting the bottom surface 33a of the recess 33, the tips 43a of the first prongs 43 can contact the inner surface 3b of the inner member 3. In the assembled state, as illustrated in FIG. 5, the flanges 41a (FIG. 4) of each clip 4 and the tip 43a (FIG. 5) of each of the first prongs 43 sandwich the inner member 3. Thereby, the clips 4 and the inner member 3 can be integrally secured (temporarily held). In addition, the first prongs 43 being the snap fit mechanism allows an operator to feel a click at his or her hand and fingers when inserting the clip 4 into the through-hole 3c, or to hear a snap at the time of releasing the pressed and bent first prongs 43 from the inner surface of the through-hole 3c. This make it possible for the operator to easily recognize that the clip 4 has reached the position to hold the inner member 3. The tip 43a is an example of a contact.

In the embodiment, the first prongs 43 are of cantilever (plate spring) form, extending oppositely to the extending direction (to the vehicular bottom) of the arms 42 as illustrated in FIGS. 5 to 7. Thus, the first prongs 43 have relatively lower bending rigidity against a load received from the inner surface of the through-hole 3c in a direction (outside in the vehicle width direction; left side in FIG. 4) intersecting with the extending direction of the arm 42, and can elastically deform in the intersecting direction relatively easily. Meanwhile, the first prongs 43 have relatively higher buckling rigidity against a load from the extending direction of the arm 42 (toward the vehicular bottom; vertical direction in FIG. 4), and cannot elastically deform easily in the extending direction of the arm 42. By such structure, the first prongs 43 are allowed to elastically deform in the intersecting direction with the extending direction of the arm 42, thereby ensuring ease of insertion of the clip 4 into the through-hole 3c and firmly holding the inner member 3 in the extending direction of the arm 42. The first prongs 43 are an example of a holder.

In the embodiment, the through-hole 3c penetrates the front and rear surfaces of the inner member 3, i.e., between the bottom surface 33a of the recess 33 and the opposite inner surface 3b of the inner member 3. Thus, the clip 4 is relatively easily insertable along the extension of the arm 42. As compared with the clip 4 penetrating through a partial through-hole (recess) up to the middle of the inner member 3 and not reaching the outer surface 3a in a thickness direction, the part of the clip 4 sandwiched by the flanges 41a and the first prongs 43 can be enlarged in thickness. Thus, the joint part of the clip 4 and the inner member 3 can be further enhanced in strength.

In the embodiment, as illustrated in FIG. 4, the arm 42 extends along the inner surface of the through-hole 3c in the vehicle width direction, and the second prong 44 extends along the outer surface of the through-hole 3c in the vehicle width direction. In the assembled state, the expanded part 44a at the tip of the second prong 44 is exposed from the through-hole 3c to the opposite side of the head 41, and faces the inner surface 3b of the side wall 32 of the inner member 3 with a fine gap. The second prong 44 is of cantilever (plate spring) form that extends in the extending direction (toward vehicular bottom) of the arm 42. When receiving, from the inner surface 3b of the side wall 32 of the elastically internally deformed inner member 3 by external force from outside in the vehicle width direction, a load for moving the second prong 44 in the direction (inward in the vehicle width direction; right side in FIG. 4) intersecting with the extending direction of the arm 42, the second prong 44 can elastically deform. In other words, the second prong 44 functions as a buffer that buffers external force. By such structure, the clips 4 can be less damaged by external force.

In the embodiment, as illustrated in FIGS. 4 and 5, the tip 43a of the first prong 43 and the second prong 44 are disposed oppositely across the edge 10a, when viewed from the direction along the edge 10. Due to the external force, a downward load may act on the tip 43a of the first prong 43 from the top wall 31 of the inner member 3. This load causes a rotational moment M1 to the clip 4 such that the hook 42d moves outward (clockwise in FIG. 5) in the vehicle width direction. On the other hand, the expanded part 44a of the second prong 44 may receive a load from the side wall 32 of the inner member 3 to move inward in the vehicle width direction. This load causes a rotation moment M2 to the clip 4 such that the hook 42d moves inward (counterclockwise in FIG. 4) in the vehicle width direction. Thus, the expanded part 44a of the second prong 44 can function as a rotation stop that prevents the rotation moment M1 based on a load input from the tip 43a of the first prong 43. The tip 43a of the first prong 43 can function as a rotation stop that prevents the rotation moment M2 based on a load input from the expanded part 44a of the second prong 44. By such structure, the clip 4 can be stably held by the inner member 3.

In the embodiment, as illustrated in FIGS. 6 and 7, the arm 42 is located between the two first prongs 43. Thereby, the two first prongs 43 serve as a support to prevent the clip 4 from inclining in the direction along the edge 10a.

In the embodiment, as illustrated in FIG. 3, the fastener 24 is aligned with the clip 4 in the vehicle width direction. By fastening the fastener 24, the design member 2 and the inner member 3 are integrated together, and the clip 4 can be more firmly fixed to the inner member 3 as compared with the arrangement that the fastener 24 and the clip 4 are offset in the vehicle front-rear direction.

As described above, in the embodiment, the clips 4 insert through the through-holes 3c of the inner member 3 for attachment, for example.

The through-holes 3c penetrate the front and rear surfaces of the inner member 3, that is, between the bottom surface 33a of the recess 33 and the inner surface 3b. This enables the part of the inner member 3 holding the clips 4 to be relatively thicker in thickness. Thus, the joint part between the clips 4 and the inner member 3 can be further enhanced in strength. Being covered with the design member 2, the clips 4 hardly drop off from the inner member 3.

In the embodiment, for example, each of the clips 4 includes the head 41, the arm 42, and the first prongs 43 (holders). The head 41 includes the flanges 41a located between the bottom surface 33a of the recess 33 in the outer surface 3a of the inner member 3 and the inner surface 2b of the design member 2, and faces the inner surface 2b. The arm 42 projects from the head 41 to be away from the design member 2 and inserts through the through-hole 3c of the inner member 3 open to the recess 33. The hook 42d (fixing part) is provided to the arm 42 on the opposite side of the head 41 with respect to the through-hole 3c, and is hooked to the door panel 10 to fix the frame molding 1 to the door panel 10. The first prongs 43 (holders) are located on the opposite side of the head 41 with respect to the through-hole 3c, and holds the inner member 3 with the flanges 41a.

By such structure, the inner member 3 is made of a material having higher rigidity and the clips 4 are made of a more elastically deformable material, for example, thereby attaining a higher-rigidity, easily and securely attachable frame molding 1. Since the head 41 and the first prongs 43 of the clip 4 inserting through the through-hole 3c of the inner member 3 holds the inner member 3 in-between, for example, the clips 4 can be more easily or securely attached to the inner member 3. The clip 4 is relatively easily insertable into the through-holes 3c in the extending direction of the arm 42. As compared with the clip 4 inserting through a partial through-hole (recess) up to the middle of the thickness of the inner member 3, in other words, extending from the inner surface 3b of the inner member 3 up to the middle of the thickness, not reaching the outer surface 3a, the clip 4 can be simplified in structure and the part of the clip 4 sandwiched by the flanges 41a and the first prongs 43 can be increased in thickness. Thus, the joint part of the clip 4 and the inner member 3 can be further enhanced in strength.

In the embodiment, the arm 42 is located between the two first prongs 43 (holders). That is, the two first prongs 43 serve as a support to prevent the clip 4 from inclining in the direction along the edge 10a, for example.

In the embodiment, the design member 2 includes the fasteners 24 that are fastened to the inner member 3 and aligned with the clips 4 in the direction intersecting with the direction along the edge 10a. Thereby, the clips 4 can be more firmly fixed to the inner member 3, for example, as compared with the disposition that the fasteners 24 and the clips 4 offset in the direction along the edge 10a. The clips 4 are not directly but indirectly fastened, therefore, the clips 4 receive less stress, thereby improving their reliability.

In the embodiment, each of the clips 4 (head 41) faces the inner surface 2b of the design member 2 with the gap g. Thereby, the outer surface 3a of the inner member 3 is closely attached to the inner surface 2b of the design member 2 while the outer surface 41c of the head 41 is not closely attached to the inner surface 2b of the design member 2. Thus, the design member 2 is less likely to be dented by the boundary between the head 41 and the inner member 3, for example.

In the embodiment, each of the clips 4 includes the elastically deformable second prong 44 (buffer unit) that buffers external force from outside in the vehicle width direction, at a more outward position than the arm 42 in the vehicle width direction with the frame molding 1 attached to the door panel 10. By such arrangement, for example, the clips 4 are hardly damaged by external force.

In the embodiment, the tips 43a (contacts) of the first prongs 43 (holders) and the second prong 44 (buffer) are oppositely disposed across the arm 42, when viewed from the direction along the edge 10a. This can prevent, for example, each of the clips 4 from inclining in the direction intersecting with the direction along the edge 10a.

The frame molding described above includes the inner member with the through-hole penetrating the front and rear surfaces. Because of this, the part of the inner member holding the clips can be formed in relatively thicker thickness. Thus, the joint part of the clips and the inner member can be further enhanced in strength.

As described above, the embodiment according to the present invention has been presented by way of example only and is not intended to limit the scope of the invention. The present invention may be embodied in a variety of other forms, and various omissions, substitutions, combinations and changes may be made without departing from the spirit of the invention. The accompanying claims and their equivalents are intended to cover such forms or modifications as would fall within the scope and spirit of the invention. Specifications such as each configuration and a shape (structures, kinds, directions, shapes, size, length, width, thickness, height, the number, disposition, position, materials, and the like) can be modified and implemented as appropriate.

What is claimed is:

1. A frame molding comprising:
  a design member that extends along an edge of a window aperture of a door panel, and includes an exposed surface and an inner surface opposite to the exposed surface;
  an inner member that extends along the edge and is covered with the design member, the inner member including an outer surface, provided with a through-hole, and fixed to the design member, the outer surface that faces the inner surface of the design member, the through-hole being open to the outer surface and extending in a direction away from the design member; and a clip that inserts through the through-hole of the inner member for fixing, and is covered with the design member, the clip including a fixing part that projects from the inner member oppositely to the design member for fixing to the door panel.

2. The frame molding according to claim 1, wherein the clip includes: a head that includes a flange between a bottom surface of a recess in the outer surface of the inner member and the inner surface of the design member, and faces the inner surface of the design member; an arm that projects from the head to be away from the design member and inserts through the through-hole open to the recess of the inner member; and a holder provided on the opposite side of the head with respect to the through-hole and holds the inner member with the flange, and the fixing part is provided to the arm.

3. The frame molding according to claim 2, wherein
the holder includes two holders that are separated from each other in a direction along the edge, and
the arm is disposed between the two holders.

4. The frame molding according to claim 1, wherein the design member includes a fastener that is fastened to the inner member and aligned with the clip in a direction intersecting with the direction along the edge.

5. The frame molding according to claim 1, wherein the clip faces the inner surface of the design member with a gap.

6. The frame molding according to claim 2, wherein the clip includes an elastically deformable buffer at a position more outside than the arm in a vehicle width direction while the frame molding is attached to the door panel, the buffer that buffers external force from outside in the vehicle width direction.

7. The frame molding according to claim 6, wherein a contact between the holder and the inner member and the buffer are oppositely disposed across the arm, when viewed from a direction along the edge.

* * * * *